(12) United States Patent
Mademann

(10) Patent No.: US 7,072,674 B1
(45) Date of Patent: Jul. 4, 2006

(54) METHOD AND SYSTEMS FOR PAGING A RADIOTELEPHONE UNIT BASED ON THE UNIT'S CURRENT CELL LOCATION

(75) Inventor: Frank Mademann, Strausberg (DE)

(73) Assignee: Siemens Aktiengesellschaft, Munich (DE)

( * ) Notice: Subject to any disclaimer, the term of this patent is extended or adjusted under 35 U.S.C. 154(b) by 1722 days.

(21) Appl. No.: 09/029,688

(22) PCT Filed: Aug. 21, 1996

(86) PCT No.: PCT/DE96/01550

§ 371 (c)(1),
(2), (4) Date: Mar. 3, 1998

(87) PCT Pub. No.: WO97/09837

PCT Pub. Date: Mar. 13, 1997

(30) Foreign Application Priority Data

Sep. 4, 1995 (DE) ................................. 195 32 604

(51) Int. Cl.
*H04Q 7/20* (2006.01)
(52) U.S. Cl. .................. 455/458; 455/456.1; 455/433; 455/435.1
(58) Field of Classification Search ................ 455/435, 455/433, 432, 422, 456, 458, 517, 440, 435.1, 455/432.1, 432.2, 456.1, 456.5, 456.6, 525
See application file for complete search history.

(56) References Cited

U.S. PATENT DOCUMENTS

| | | | |
|---|---|---|---|
| 5,305,466 A | | 4/1994 | Taketsugu .................. 455/435 |
| 5,369,681 A | * | 11/1994 | Boudreau et al. ........... 455/456 |
| 5,588,043 A | * | 12/1996 | Tiedemann, Jr. ............ 455/435 |
| 5,875,400 A | * | 2/1999 | Madhavapeddy et al. ...................... 455/435 X |
| 5,953,667 A | * | 9/1999 | Kauppi ....................... 455/440 |

FOREIGN PATENT DOCUMENTS

DE  43 32 758 A1  3/1995

(Continued)

OTHER PUBLICATIONS

IEEE Transactions on Vehicular Technology, vol. 44, No. 3, (1995) Aug., George L. Lyberopoulos, Intelligent Paging Strategies For Third Generation Mobile Telecommunication Systems, pp. 543-553.

(Continued)

*Primary Examiner*—Nay Maung
*Assistant Examiner*—Philip J. Sobutka
(74) *Attorney, Agent, or Firm*—Morrison & Foerster LLP

(57) ABSTRACT

In the transmission of a message (LU) from a subscriber station (MS), a cell recognition signal (e.g. CI2) identifying the current radio cell (e.g. C2) in which the subscriber station (MS) is located is transmitted towards the mobile radio system with it and stored in a subscriber database (NVLR) of the mobile radio system. The stored cell recognition signal (e.g. CI2) makes it possible to call the subscriber station (MS) via a radio message to the most recently used radio cell(s) (e.g. C2) and possibly also to its/their neighboring radio cells. This reduces the signaling load on the transmission of the radio message (effective paging) in the area where there are radio cells. It is possible to derive the location information on the radio cell plane, which consists of the cell recognition to identify the radio cell last used by the subscriber station, without any additional signaling load.

13 Claims, 2 Drawing Sheets

FOREIGN PATENT DOCUMENTS

| | | |
|---|---|---|
| DE | 195 24 659 C1 | 10/1996 |
| EP | 0 454 648 A2 | 10/1991 |
| WO | WO 93/23965 | 11/1993 |
| WO | WO 94/07337 | 3/1994 |
| WO | WO 95/28063 | 10/1995 |

OTHER PUBLICATIONS

Jacek Biala, Mobilfunk und Intelligente Netze, Verlag Vieweg Braunschweig (1994), pp. 145-146; 169-171 and 287-290. (English-Language Translation Enclosed).*

* cited by examiner

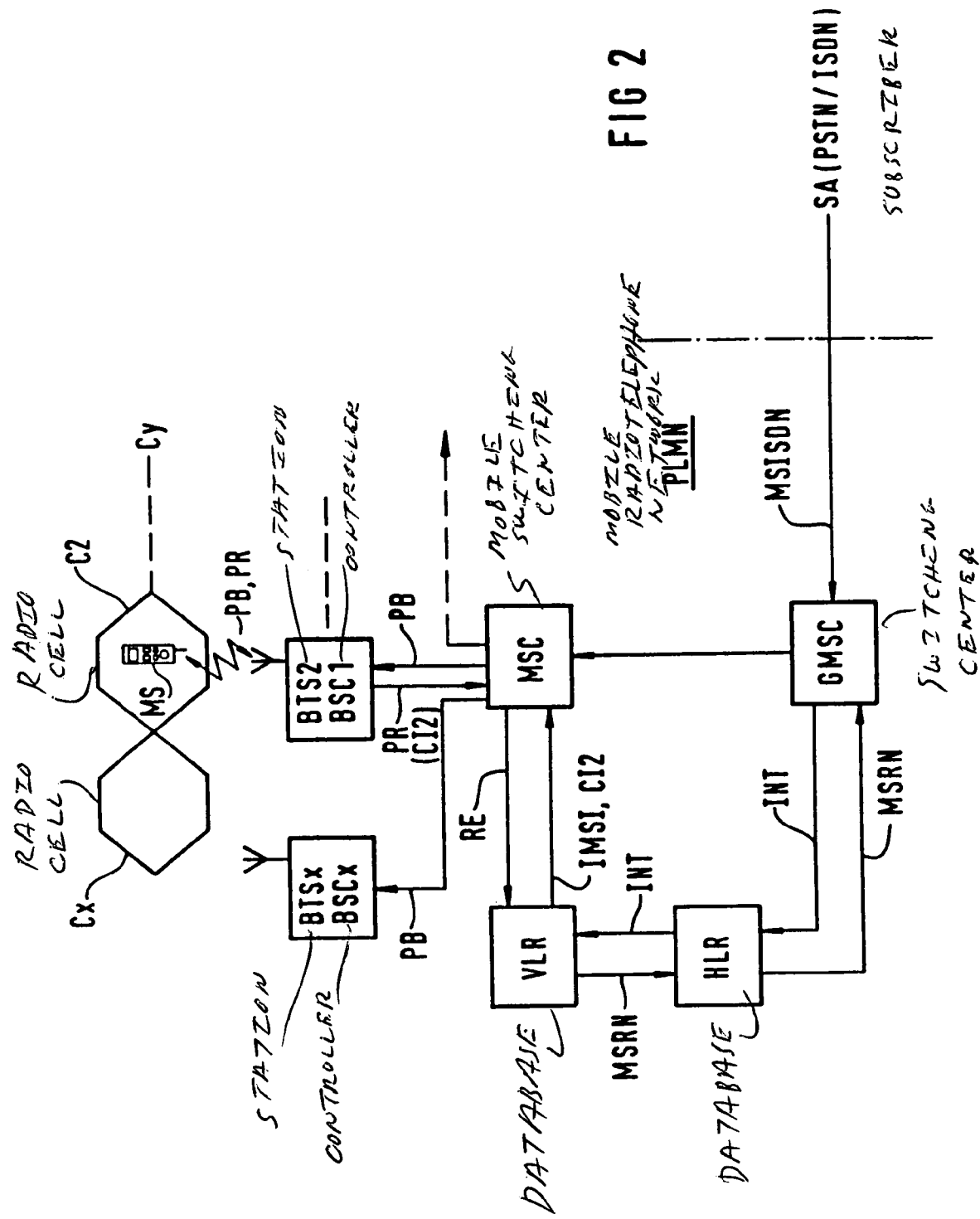

METHOD AND SYSTEMS FOR PAGING A RADIOTELEPHONE UNIT BASED ON THE UNIT'S CURRENT CELL LOCATION

BACKGROUND OF THE INVENTION

The invention relates to a method and a system for sending a radio paging message to radiotelephone subscriber stations of mobile radiotelephone subscribers of a cellularly constructed mobile radiotelephone network.

In cellular mobile radiotelephone networks, the location of radiotelephone subscriber stations of the mobile radiotelephone subscribers are managed on the basis of location areas (location areas) that are respectively assembled from one or several radio cells and that can be identified by means of an associated location area identifier (location area identity). From the system specification "D900 Mobile Communication System," by Huder/Geier, Siemens AG 1992 (order number A30808-X3231-X-2-7618), a cellularly constructed digital mobile radiotelephone network is known that is operated according to the GSM standard (Global System for Mobile Communication). In the case of the setup of a connection to the radiotelephone subscriber stations, e.g. on the basis of a call initiated from another network and directed to the mobile radiotelephone subscriber (mobile terminated call), a radio paging message is transmitted into all radio cells of the location area in which the called mobile radiotelephone subscriber is located with his radiotelephone subscriber station (paging). The radio paging message serves to prompt the mobile radiotelephone subscriber to register himself with his radiotelephone subscriber station in the network, or, respectively, at the installations thereof—the responsible base transceiver station. Due to the fact that the radio paging message must always be transmitted to all the radio cells of the known location area, a high load arises both for the concerned installations of the mobile radiotelephone network that are involved in the signaling and also for the signaling channels in the radio cells. In the radio cells, the paging message is sent on control channels. The signaling load increases proportionally given an increasing number of radio cells in a location area.

From the international patent application WO93/23965, a cellular communication system is known in which a radio paging message can be transmitted to radiotelephone subscriber stations within a service area (service area) (paging). Paging regions are thereby defined that consist of a multiplicity of location areas (location areas). The paging message is first transmitted to the location area, and is subsequently transmitted into the larger paging area for the case in which the radio paging message remains unanswered. An item of information for the identification of the current location area is transmitted to the communication system by each radiotelephone subscriber station.

From the international patent application WO94/07337, a cellular mobile radiotelephone network is known in which a subscriber-specific and temporary paging area is defined for a radiotelephone subscriber station that is moving in a particular cell of a paging area consisting of one or several radio cells. A timer thereby starts for the selected radiotelephone subscriber station as soon as it goes into the paging area, and an initialization message is activated after the elapsing of a predeterminable time duration. This message causes the network to define the temporary paging area and to store it in a subscriber database of the network. The smallest paging area comprises only a single radio cell.

SUMMARY OF THE INVENTION

The object of the present invention is to indicate a method and a system of the type named above that enables a more effective paging.

Accordingly, in the transmission of messages sent respectively by the radiotelephone subscriber station, a cell identifier that identifies the current radio cell in which the radiotelephone subscriber station is located is concurrently sent, in addition to the location area identifier, in the direction of the mobile radiotelephone network, and is stored in a subscriber database of the mobile radiotelephone network. In addition, the cell identifier is entered in a list of cell identifiers on the basis of which the radio paging message is sent. This means that an item of information concerning the radio cell used by the mobile radiotelephone subscriber or, respectively, the radiotelephone subscriber station can be obtained without additional signaling traffic. The derivation of the location information on the radio cell level thus ensues without increasing the signaling load. Rather, there is indeed a reduction of the signaling load during the transmission of the paging message (paging), due to the fact that, on the basis of the cell identifiers stored in the list, a paging is carried out to the last-used radio cell or cells, and, if warranted, additionally to the radio cells adjacent thereto. Especially for radiotelephone subscriber stations with rapidly successive interactions with the mobile radiotelephone network (in particular given the transmission of data packets according to a separate packet data service (General Packet Radio Service)), or for quasi-stationary radiotelephone subscriber stations (which, like wire-bound subscriber stations, are located for a longer period of time at the same location), the probability of a change of radio cell is low. For this reason, the effective paging to the last-used radio cell or cells that can be identified by the corresponding cell identifiers leads to a reduction of the signaling load and to an increase of the radio transmission capacity during the transmission of the radio paging message within the respective location area.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 shows the connection setup to a radiotelephone subscriber station by means of transmission of a radio paging message to the last-used radio cell.

DESCRIPTION OF THE PREFERRED EMBODIMENTS

Figure 1:
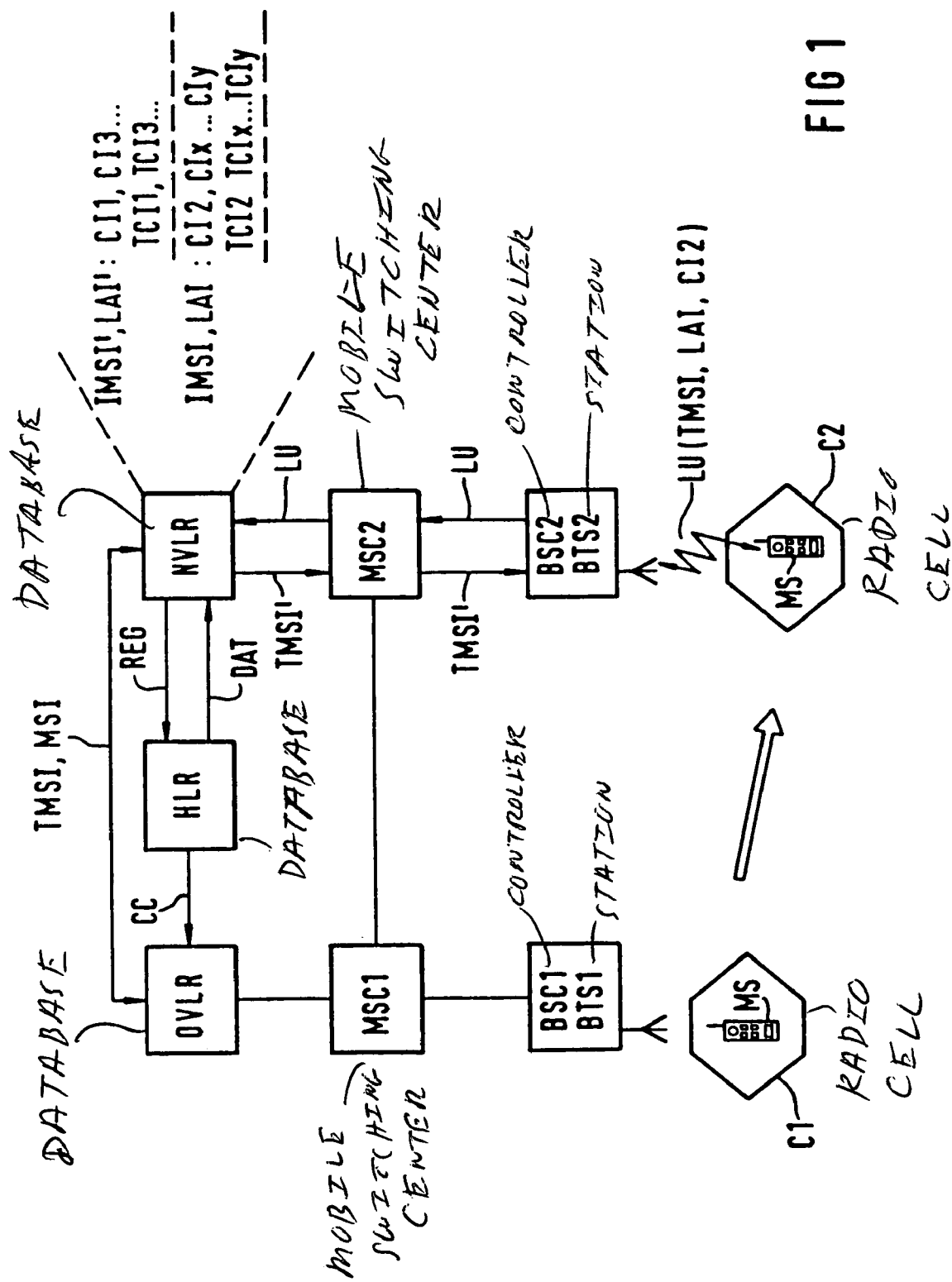
FIG. 1 shows the location registration for a radiotelephone subscriber station, given a change of location from one radio cell to another radio cell.

FIG. 1 snows, in a schematic switching diagram, the location registration given a change of location of a mobile radiotelephone subscriber, with its associated radiotelephone subscriber station MS, from a radio cell C1 to a radio cell C2 in a digital mobile radiotelephone network constructed from a plurality of radio cells. A procedure for the start of the location registration of the radiotelephone subscriber station MS is thereby initiated as soon as the mobile radiotelephone subscriber moves from a radio cell C1 into the new radio cell C2, and is thereby served by a new subscriber database NVLR in place of a previous subscriber database OVLR. In the decentral subscriber databases OVLR and NVLR, the subscriber data of mobile radiotelephone subscribers who are currently moving in a location area allocated to the subscriber database are temporarily stored for the duration of the stay. The subscriber data of all mobile radiotelephone subscribers registered in the mobile radiotelephone network are stored centrally in a subscriber database HLR, which can be accessed both by the previous decentral subscriber database OVLR and also by the new decentral subscriber database NVLR. A mobile switching center MSC1 or, respectively, MSC2, which are interconnected, is connected to each decentral subscriber database OVLR or, respectively, NVLR. The mobile switching center MSC1, MSC2 respectively overtakes the switching-oriented functions during the connection setup in the associated location areas. The mobile switching center MSC1 is connected with a base station control BSC1 that can serve several base transceiver stations in the location area. Each radio cell of the location area comprises a base transceiver, in order to send or, respectively, receive signals via the air interface. In the present example, the base transceiver station BTS1 is arranged in the radio cell C1. A base station controller BSC2, for supervising the base transceiver stations provided in the corresponding location area, is likewise connected with the mobile switching center MSC2. In the present example, a base transceiver station BTS2, for transmission and reception of the signals transmitted through the air in the radio cell C2, is located in the radio cell C2.

If it is determined by the radiotelephone subscriber station MS, by means of the evaluation of adjacent base transceiver stations, that due to the change of the radiotelephone subscriber station from radio cell C1 to radio cell C2 the items of information in the subscriber databases concerning the current location of the mobile radiotelephone subscriber are to be replaced, the radiotelephone subscriber station MS transmits a message LU (Location Update). The message LU is received by the base transceiver station BTS2 of the new radio cell C2, and is forwarded to the new decentral subscriber database NVLR via the base station controller BSC2 and the mobile switching center MSC2. With the message LU, a temporary mobile radiotelephone subscriber identifier TMSI is transmitted for the identification of the mobile radiotelephone subscriber, and a location area identifier LAI is transmitted for the identification of the location area to which the radio cell C2 belongs. In addition to these items of information, a cell identifier CI2, which identifies the current radio cell C2 in which the radiotelephone subscriber station MS is currently located, is concurrently sent by the radiotelephone subscriber station MS, and is stored in the new decentral subscriber database NVLR.

The storing of the cell identifier CI2 ensues together with an international subscriber identifier IMSI that identifies the mobile radiotelephone subscriber, and that requests the new subscriber database NVLR from the previous subscriber database OVLR. For this purpose, the temporary mobile radiotelephone subscriber identifier TMSI is sent to the old subscriber database OVLR. Besides the international mobile radiotelephone identifier IMSI, the location area identifier LAI is entered in the subscriber database NVLR. For the international mobile radiotelephone subscriber identifier IMSI and the location area identifier LAI, there exists in the decentral subscriber database NVLR a list of the last-used radio cells, which can be recognized by the stored cell identifiers CI2, CIx ... CIy. Together with the cell identifiers CI2 ..., the associated times of the transmission of the cell identifiers CI2 ... can be registered in the subscriber database NVLR under the international mobile radiotelephone subscriber identifier IMSI and under the location area identifier LAI. In the present example, the corresponding times TCI2, TCIx ... TCIy belong to the cell identifiers CI2, CIx .... CIy.

For a different international mobile radiotelephone subscriber identifier IMSI' and a different location area identifier LAI', cell identifiers CI1, CI3 ... are stored in the subscriber database NVLR with the associated times TCI1, TCI3 in the sequence of the last-used radio cells. With the stored times, an item of information is obtained for the improvement of the hit certainty with which the mobile radiotelephone subscriber can successfully be found in a determined number of radio cells by means of the radio paging message.

After the execution of an authentification with which the access authorization of the mobile radiotelephone subscriber to the mobile radiotelephone network is monitored, the new subscriber database NVLR requests the subscriber data of the mobile radiotelephone subscriber from the central subscriber database in the request REQ. The subscriber database HLR sends the corresponding subscriber data DAT back to the requesting subscriber database NVLR, and initiates, by means of the transmission of a message CC to the previous subscriber database OVLR, the erasing of the old subscriber data entered therein. The new subscriber database NVLR assigns the mobile radiotelephone subscriber a new temporary mobile radiotelephone identifier TMSI', which is transmitted to the radiotelephone subscriber station MS in the radio cell C2 via the mobile switching center MSC2, the base station controller BSC2 and the base transceiver station BTS2.

FIG. 2 shows, in a block switching diagram, the connection setup given an incoming call in the mobile radiotelephone network PLMN, said call having been initiated by a subscriber SA of a public telephone network PSTN or of a service-integrating communication network ISDN. In the present example, the called mobile radiotelephone subscriber, with his radiotelephone subscriber station MS, is located in the radio cell C2 of a location area comprising several radio cells, said area being identifiable on the basis of an associated location area identifier. The calling subscriber SA, who as a rule does not know the current location of the mobile radiotelephone subscriber, dials a call number MSISDN, by means of which the mobile radiotelephone subscriber can be reached everywhere in the mobile radiotelephone network PLMN. By transmitting the radio paging message (paging), it is brought about that the mobile radiotelephone subscriber registers himself in the network with his radiotelephone subscriber station MS. The subscriber call number MSISDN of the mobile radiotelephone subscriber is received by a mobile switching center GMSC, which is arranged in the mobile radiotelephone network PLMN at the interface to other communication networks. From the incoming subscriber call number MSISDN, the mobile switching center GMSC determines the correct central subscriber database HLR for the called mobile radiotelephone subscriber, and sets up a signaling connection thereto. On the basis of the signaling connection established, a request INT (interrogation) is directed to the decentral subscriber database VLR in whose allocated location area the mobile radiotelephone subscriber is currently located. As a response to the request, the subscriber database VLR sends a mobile subscriber roaming number (MSRN) back to the central subscriber database HLR, which in turn forwards this mobile subscriber roaming number MSRN to the mobile switching center GMSC. On the basis of the incoming mobile subscriber roaming number MSRN, the mobile switching center GMSC sets up a connection to a further mobile switching center MSC, which is connected with the subscriber database VLR that is responsible for the called mobile radiotelephone subscriber.

Since the mobile switching center MSC still does not know the mobile radiotelephone subscriber up to this time, this center requests from its subscriber database VLR the subscriber data of the mobile radiotelephone subscriber that are required for the connection setup, on the basis of a message RE. The decentral subscriber database VLR thereupon supplies the international mobile radiotelephone subscriber identifier IMSI and the cell identifier CI2 for the identification of the last-used radio cell C2 and, if warranted, additional cell identifiers of radio cells that are adjacent to the radio cell C2 in the known location area. On the basis of the international mobile radiotelephone subscriber identifier IMSI and cell identifier CI2 transmitted to the mobile switching center MSC, the mobile switching center MSC causes the transmission of a radio paging message PB (paging broadcast) to the radio cells C2 identified by the cell identifier CI2, and, if warranted, to the radio cells Cx . . . . Cy adjacent thereto. The paging broadcast PB is transmitted to the radiotelephone subscriber station MS by means of the responsible base station controller BSC1 and the base transceiver station BTS2 arranged in the radio cell C2. Adjacent radio cells Cx . . . Cy receive the paging broadcast PB in corresponding manner via the base station controller BSCx and the associated base transceiver station BTSx, etc.

For the case in which the radiotelephone subscriber station MS of the called mobile radiotelephone subscriber in the known location area is still located in the last-used radio cell C2, the radiotelephone subscriber station MS sends a response message PR (paging response) back to the mobile switching center MSC. If one of the radio cells Cx . . . . Cy adjacent to the last-used radio cell C2 contains the called radiotelephone subscriber station MS, the sending back of the paging response PB ensues correspondingly via the corresponding radio installations, consisting of a base transceiver station and a base station controller. If the radiotelephone subscriber station MS does not respond to a paging that was directed to the last-used radio cell or to several last-used radio cells and, if warranted, to the radio cells respectively adjacent thereto, the paging broadcast PB is transmitted by the mobile switching center MSC to all radio cells of the location area. In the transmission of the paging response PR from the called radiotelephone subscriber station in one of the radio cells of the location area, the cell identifier is again concurrently sent for the identification of this radio cell in which the radiotelephone subscriber station MS is present. In the present example, the paging response PR thus contains the cell identifier CI2 of the last-used radio cell C2, since the radiotelephone subscriber station MS is located therein.

The cell identifier for the identification of the current radio cell in a location area, which identifier can be transmitted without additional signaling traffic, enables an effective paging, in which the paging message is sent either to the last-used radio cell or to several last-used radio cells, and, if warranted, to the radio cells respectively adjacent thereto. Especially for radiotelephone subscriber stations having rapidly successive interactions with the mobile radiotelephone network, e.g. in the transmission of data packets according to a separate packet data service (general packet radio service) in the mobile radiotelephone network, or given stationary radiotelephone subscriber stations that are used by the radiotelephone subscriber as replacements for wire-bound stationary network subscriber stations, the present invention has the advantage of a reduction of the signaling load in the paging of the radiotelephone subscriber stations, and an increase of the paging capacity in the respective location area. In addition, the cell identifier for the identification of the respective radio cell can be derived without increasing the signaling load in the mobile radiotelephone network. The additional memory expense for the registration of the cell identifiers, including the associated times at which transmission takes place into the respective decentral subscriber databases, can thereby be kept within limits according to the number of radio cells and the size of the location area. The method for the transmission of data packets according to the packet data service in a mobile radiotelephone network is specified for example in the German letters patent DE 19 524 659 C1

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for sending a radio paging broadcast to radiotelephone subscriber stations of mobile radiotelephone subscribers of a cellularly constructed mobile radiotelephone network, comprising the steps of:
    managing locations of the radiotelephone subscriber stations by location areas that consist respectively of at least one radio cell and that are identifiable by a location area identifier;
    calling radiotelephone subscriber stations in a location area by transmission of a radio paging broadcast;
    sending, in a transmission of messages respectively sent by a respective radiotelephone subscriber station, a transmitted cell identifier that identifies a current radio cell in which the respective radiotelephone subscriber station is currently located, the transmitted cell identifier being sent in addition to the location area identifier;
    storing the transmitted cell identifier in a subscriber database of the mobile radiotelephone network;
    entering the transmitted cell identifier in a list of cell identifiers comprising both the transmitted cell identifier and retained cell identifiers which were formerly transmitted cell identifiers, thereby retaining transmitted cell identifiers; and
    sending the paging broadcast to at least one cell listed in the list of cell identifiers.

2. The method according to claim 1, wherein the radio paging broadcast is transmitted to a last-used radio cell determined by the stored cell identifier.

3. The method according to claim 1, wherein the radio paging broadcast is transmitted to several last-used radio cells that are determined by the stored cell identifiers.

4. The method according to claim 1, wherein the radio paging broadcast is transmitted to a last-used radio cell, and, in addition, to radio cells adjacent thereto that are determined by the stored cell identifiers.

5. The method according to claim 1, wherein to increase a certainty of a hit during calling of the respective radiotelephone subscriber station, a time of transmission of the cell identifier is stored in the subscriber database, together with the cell identifier.

6. The method according to claim 1, wherein if a paging response message that can be sent back by a radiotelephone subscriber station fails to appear, the radio paging broadcast is transmitted to all radio cells of a location area.

7. The method according to claim 1, wherein the cell identifier and a time of transmission of the cell identifier are stored in a decentral subscriber database that is responsible for the radiotelephone subscriber stations located in an allocated location area.

8. The method according to claim 1, wherein the cell identifier and a time of transmission of the cell identifier are stored in the subscriber database, together with a subscriber identifier that identifies the mobile radiotelephone subscriber.

9. The method according to claim 1, wherein the cell identifier is respectively concurrently sent in data packets that are transmitted in the mobile radiotelephone network according to a data packet service.

10. A system for transmitting a radio paging broadcast to radiotelephone subscriber stations of mobile radiotelephone subscribers in location areas of a cellularly constructed mobile radiotelephone network, whereby the location areas respectively manage locations of the radiotelephone subscriber stations, and respectively consist of at least one radio cell, and are identifiable by a location area identifier, comprising:

the radiotelephone subscriber stations having means for transmitting messages that respectively contain, in addition to the location area identifier, a transmitted cell identifier that identifies a current radio cell in which a respective radiotelephone subscriber station is currently located; and the mobile radiotelephone network having at least one subscriber database in which the transmitted cell identifier is entered in a list of cell identifiers comprising both the transmitted cell identifier and retained cell identifiers which were formerly transmitted cell identifiers, and the transmitted cell identifier is retained, the radio paging broadcast being sent to at least one cell listed in the list of cell identifiers.

11. The system according to claim 10, wherein the mobile radiotelephone network has means for transmitting the radio paging broadcast to a last-used radio cell that is determined by the entered cell identifier.

12. The system according to claim 10, wherein the mobile radiotelephone network is provided with means for transmitting the radio paging broadcast to several last-used radio cells determined by the entered cell identifiers.

13. The system according to claim 10, wherein the mobile radiotelephone network has means for transmitting the radio paging broadcast to a last-used radio cell, and, in addition, to radio cells adjacent thereto as determined by the entered cell identifiers.

* * * * *